US010252386B2

(12) United States Patent
Saito et al.

(10) Patent No.: US 10,252,386 B2
(45) Date of Patent: Apr. 9, 2019

(54) TOOL DRIVING DEVICE, TOOL DRIVING METHOD, AND TOOL FEEDING MECHANISM FOR TOOL DRIVING DEVICE

(71) Applicant: Fuji Jukogyo Kabushiki Kaisha, Tokyo (JP)

(72) Inventors: Manabu Saito, Tokyo (JP); Tatsuo Nakahata, Tokyo (JP); Hideharu Takahashi, Tokyo (JP); Toshio Nishino, Tokyo (JP); Masao Watanabe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 858 days.

(21) Appl. No.: 13/971,276

(22) Filed: Aug. 20, 2013

(65) Prior Publication Data

US 2014/0054053 A1 Feb. 27, 2014

(30) Foreign Application Priority Data

Aug. 23, 2012 (JP) .................... 2012-184643

(51) Int. Cl.
*B23Q 5/26* (2006.01)
*B23Q 5/32* (2006.01)
(Continued)

(52) U.S. Cl.
CPC ............ *B23Q 5/263* (2013.01); *B23B 45/003* (2013.01); *B23Q 5/326* (2013.01); *B25F 5/021* (2013.01)

(58) Field of Classification Search
CPC ........ B23Q 5/263; B23Q 5/265; B23Q 5/266; B23Q 5/268; B23Q 5/326; B23B 51/0054;
(Continued)

(56) References Cited

U.S. PATENT DOCUMENTS 1,315,270 A * 9/1919 Worden ............... B25H 1/0057
408/100
1,470,143 A * 10/1923 Buterbaugh ......... B25H 1/0078
408/112
(Continued)

FOREIGN PATENT DOCUMENTS

DE  3902656 A1 * 8/1990 ............. B23Q 5/266
EP  0 562 714 A2  9/1993
(Continued)

OTHER PUBLICATIONS

Chinese Office Action for Application No. 201310362041.0 dated Jul. 2, 2015 (7 pages).
(Continued)

*Primary Examiner* — Stephen F. Gerrity
*Assistant Examiner* — Joshua G Kotis
(74) *Attorney, Agent, or Firm* — Smith, Gambrell & Russell, LLP

(57) ABSTRACT

A tool feeding mechanism for a tool driving device includes a cylinder mechanism, a positioning mechanism, and a holding mechanism. The cylinder mechanism moves a tool rotation driving device to hold and rotate a tool, in a tool axis direction on an exterior of a cylinder tube using power of a piston. The positioning mechanism is connected to the cylinder tube side of the cylinder mechanism either directly or indirectly in order to position the cylinder mechanism relative to a workpiece. The holding mechanism holds the tool rotation driving device such that the power of the piston in the cylinder mechanism is transmitted to the tool rotation driving device.

19 Claims, 8 Drawing Sheets

(51) Int. Cl.
   *B25F 5/02* (2006.01)
   *B23B 45/00* (2006.01)
(58) Field of Classification Search
   CPC ........ E21B 19/086; E21B 44/02; E21B 44/06;
   B25H 1/0057; B25H 1/0064; B25H
   1/0078; Y10T 408/6757; Y10T 408/5647;
   Y10T 408/5653; Y10T 408/568–408/569
   USPC .............. 408/110–112, 130; 173/14, 19, 141
   See application file for complete search history.

(56) References Cited

U.S. PATENT DOCUMENTS

| | | | | |
|---|---|---|---|---|
| 1,471,137 A * | 10/1923 | Bowman | ............. | B23B 51/0054 279/142 |
| 1,791,974 A * | 2/1931 | Prellwitz | ............. | E21B 19/086 173/159 |
| 1,895,990 A * | 1/1933 | Emko | .............. | B25H 1/0078 408/112 |
| 2,454,372 A * | 11/1948 | Billeter | ............. | B23B 49/02 408/241 R |
| 2,488,992 A * | 11/1949 | Taylor | ............. | B23Q 5/265 173/162.1 |
| 2,648,238 A * | 8/1953 | Raney | ............. | B23Q 5/10 173/145 |
| 2,761,440 A * | 9/1956 | Schwab | ............. | B25H 1/0064 408/111 |
| 2,795,978 A * | 6/1957 | Kinsey | ............. | B23Q 11/0053 408/112 |
| 2,849,900 A * | 9/1958 | Heidtman, Jr. | ...... | B25H 1/0078 408/112 |
| 2,883,891 A * | 4/1959 | Robinson | ............. | B23B 49/006 408/112 |
| 2,994,235 A * | 8/1961 | Rise | ............. | B23B 51/0054 408/112 |
| 2,997,900 A * | 8/1961 | Pugsley | ............. | B25H 1/0021 144/1.1 |
| 3,051,023 A * | 8/1962 | Hirsch | ............. | B23Q 11/04 408/11 |
| 3,145,588 A * | 8/1964 | King | ............. | B23Q 5/265 137/625.6 |
| 3,342,087 A * | 9/1967 | Mulot | ............. | B23Q 5/261 408/11 |
| 3,362,447 A * | 1/1968 | Elder, Jr. | ............. | B23Q 9/0014 408/109 |
| 3,704,957 A * | 12/1972 | Petroff | ............. | B23Q 5/323 408/129 |
| 4,010,943 A * | 3/1977 | Eft | ............. | B23B 47/28 269/87.1 |
| 4,123,188 A * | 10/1978 | Deremo | ............. | B23Q 5/06 408/17 |
| 4,175,413 A * | 11/1979 | van Geffen | ............. | B21C 37/298 408/130 |
| 4,279,552 A * | 7/1981 | Epstein | ............. | B25H 1/0078 408/112 |
| 4,572,715 A * | 2/1986 | Wolff | ............. | B23B 47/287 144/154.5 |
| 4,752,161 A * | 6/1988 | Hill | ............. | B23Q 5/06 408/127 |
| 4,917,549 A * | 4/1990 | Geernaert | ............. | B23B 47/287 408/112 |
| 5,002,441 A * | 3/1991 | Dierich | ............. | B23Q 1/267 408/10 |
| 5,071,293 A * | 12/1991 | Wells | ............. | B23B 49/02 408/112 |
| 5,073,068 A * | 12/1991 | Jinkins | ............. | B23Q 5/265 408/130 |
| 5,088,171 A * | 2/1992 | Suzuki | ............. | B23B 49/02 29/26 A |
| 5,222,844 A | 6/1993 | Maass et al. | | |
| 5,352,070 A * | 10/1994 | Tehrani | ............. | B23Q 5/045 408/102 |
| 5,460,077 A * | 10/1995 | Swanson | ............. | B23Q 5/26 92/165 R |
| 5,797,708 A * | 8/1998 | Bencic | ............. | B23B 47/281 408/103 |
| 5,833,404 A * | 11/1998 | Johnson | ............. | B23Q 5/265 408/130 |
| 6,413,022 B1 * | 7/2002 | Sarh | ............. | B21J 15/10 408/16 |
| 6,860,682 B1 * | 3/2005 | Le Picq | ............. | B25H 1/0078 408/112 |
| 7,267,512 B1 * | 9/2007 | Mueller | ............. | B23B 39/00 408/1 R |
| 7,347,651 B2 * | 3/2008 | Hintze | ............. | B23B 49/008 408/112 |
| 2002/0131833 A1 | 9/2002 | Born | | |
| 2003/0049082 A1 | 3/2003 | Morrison et al. | | |
| 2004/0101376 A1* | 5/2004 | Shemeta | ............. | B23Q 5/26 408/130 |
| 2007/0147968 A1* | 6/2007 | Nappier | ............. | B23Q 5/261 408/130 |
| 2010/0247254 A1* | 9/2010 | Uchiuzo | ............. | B23B 45/04 408/57 |

FOREIGN PATENT DOCUMENTS

| | | | | |
|---|---|---|---|---|
| EP | 0 562 714 A3 | 9/1993 | | |
| FR | 2318011 A1 * | 2/1977 | .......... | B23B 47/287 |
| GB | 936432 A * | 9/1963 | .......... | B25H 1/0064 |
| JP | H05-069212 | 3/1993 | | |
| JP | 2005-096134 | 4/2005 | | |
| JP | 2010-228049 A | 10/2010 | | |
| WO | 02/060627 A1 | 8/2002 | | |

OTHER PUBLICATIONS

Extended European Search Report dated Dec. 12, 2013, in related Patent Application No. 13 180 810.7.
Second Chinese Office Action for Application No. 201310362041.0 dated Mar. 22, 2016 (6 pages).
Machine Translation of First Chinese Office Action for Application No. 201310362041.0 dated Jul. 2, 2015. (6 pages).
Machine Translation of Second Chinese Office Action for Application No. 201310362041.0 dated Mar. 22, 2016. (6 pages).
Japanese Office Action for Application No. 2012-184643 dated Aug. 2, 2016 with English Translation (11 pages).
Third Chinese Office Action for Application No. 201310362041.0 dated Oct. 19, 2016 with English Translation (11 pages).
First Korean office action dated Aug. 1, 2017, in Patent Application No. KR 10-2013-0088056 (13 Pages in Korean with English machine translation).

* cited by examiner

A-A

B-B

TOOL DRIVING DEVICE, TOOL DRIVING METHOD, AND TOOL FEEDING MECHANISM FOR TOOL DRIVING DEVICE

CROSS-REFERENCE TO RELATED APPLICATIONS

The present application claims priority from Japanese Patent Application No. 2012-184643, filed on Aug. 23, 2012, the entire contents of which are hereby incorporated by reference.

BACKGROUND OF THE INVENTION

1. Field of the Invention

An embodiment of the present invention relates to a tool driving device, a tool driving method, and a tool feeding mechanism for a tool driving device.

2. Description of the Related Art

A pneumatic drill driving device is known as a conventional hand tool (see Japanese Unexamined Patent Application Publication No. 2010-228049, for example). A pneumatic drill driving device is capable of applying a feed operation in a tool axis direction to a drill using air pressure. A drill driving device capable of this type of feed operation is also known as an air-feed drill unit.

There is demand for structural simplification and realization of feed control adapted to work in a tool driving device capable of performing a feed operation in a tool axis direction, such as an air-feed drill unit.

SUMMARY OF THE INVENTION

The present invention has been designed in consideration of the circumstances described above, and an object of the present invention is to provide a tool driving device, a tool driving method, and a tool feeding mechanism for a tool driving device with which an appropriate feed operation can be applied in a tool axis direction using a simpler structure.

An aspect of the present invention provides a tool feeding mechanism for a tool driving device including a cylinder mechanism, a positioning mechanism, and a holding mechanism. The cylinder mechanism moves a tool rotation driving device to hold and rotate a tool, in a tool axis direction on an exterior of a cylinder tube using power of a piston. The positioning mechanism is either directly or indirectly connected to the cylinder tube of the cylinder mechanism, in order to position the cylinder mechanism relative to a workpiece. The holding mechanism holds the tool rotation driving device such that the power of the piston in the cylinder mechanism is transmitted to the tool rotation driving device.

Another aspect of the present invention provides a tool driving device including the above mentioned tool feeding mechanism for a tool driving device and the above mentioned tool rotation driving device. The tool rotation driving device is connected to the tool feeding mechanism.

Another aspect of the present invention provides a tool driving method including the steps of: positioning a cylinder mechanism relative to a workpiece using a positioning mechanism that is coupled either directly or indirectly to the cylinder tube of the cylinder mechanism; holding a tool by a tool rotation driving device held such that, power of a piston provided in the cylinder mechanism is transmitted thereto, and rotating the held tool; and moving the tool rotation driving device in a tool axis direction on an exterior of the cylinder tube using the power of the piston.

DESCRIPTION OF THE PREFERRED EMBODIMENTS

A cool driving device, a tool driving method, and a tool feeding mechanism for a tool driving device according to embodiments of the present invention will be described below with reference to the attached drawings.

First Embodiment (Configuration and Functions)

Figure 1:
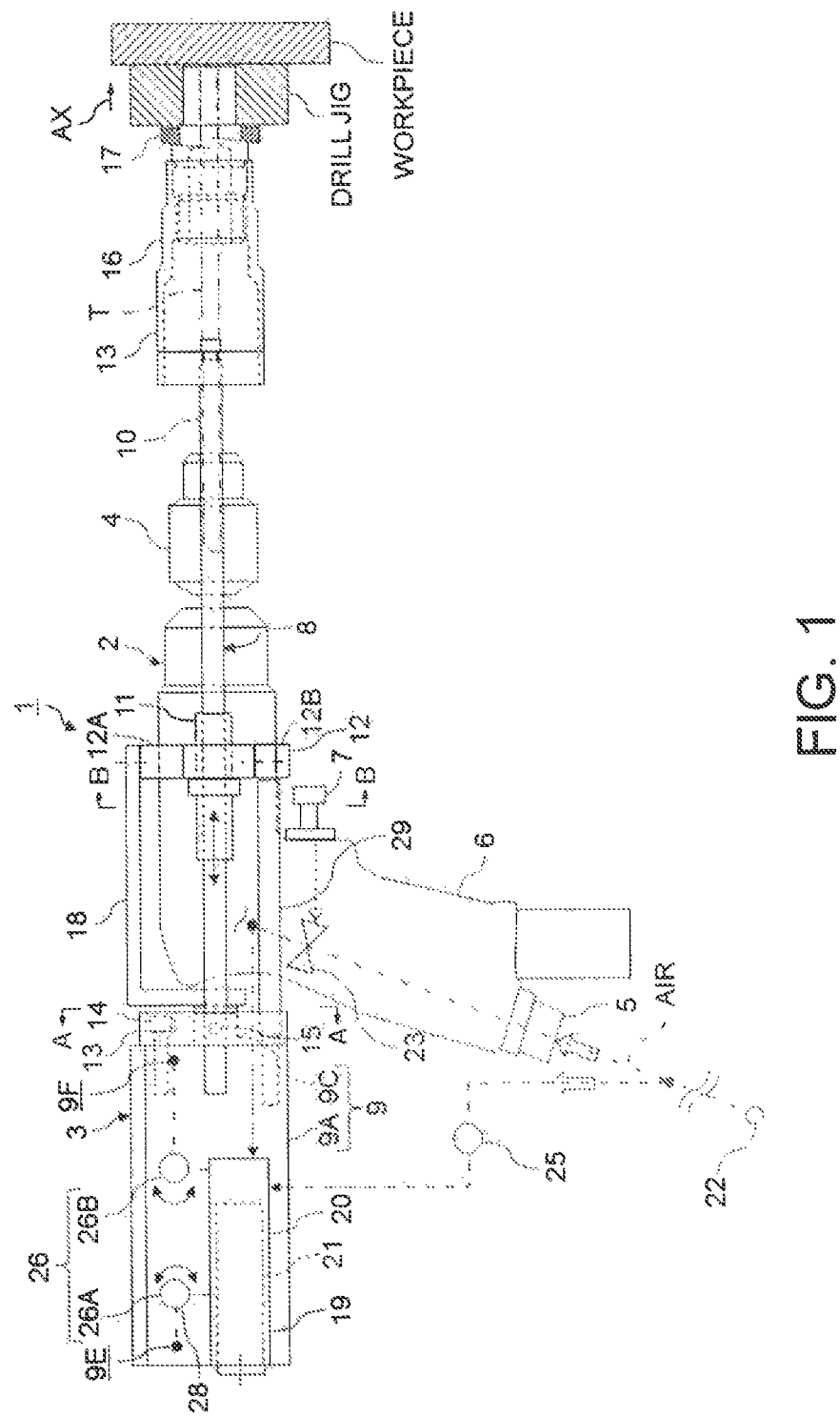
FIG. 1 is a front view of a tool driving device according to a first embodiment of the present invention.
Figure 2:
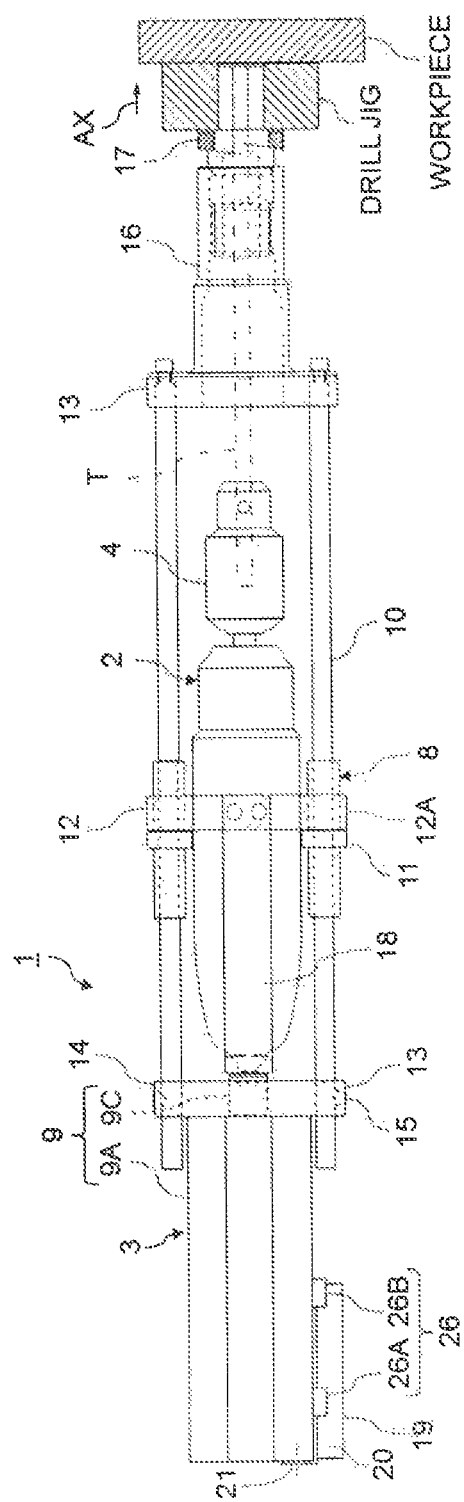
FIG. 2 is a top view of the tool driving device shown in FIG. 1.
Figure 3:
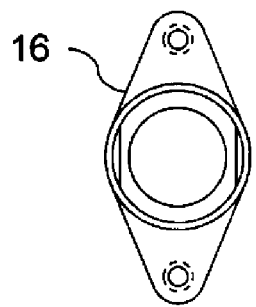
FIG. 3 is a right view of a nose piece shown in FIG. 1.
Figure 4:
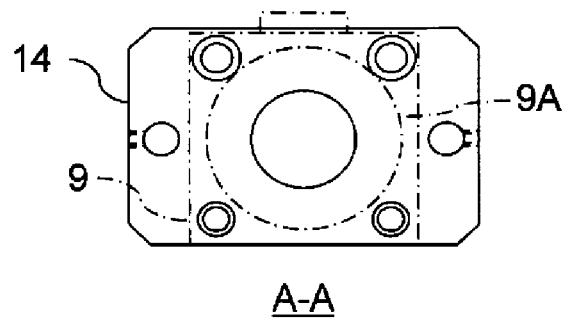
FIG. 4 is a view of a plate-shaped connector shown in FIG. 1, seen from arrows in positions A-A.
Figure 5:
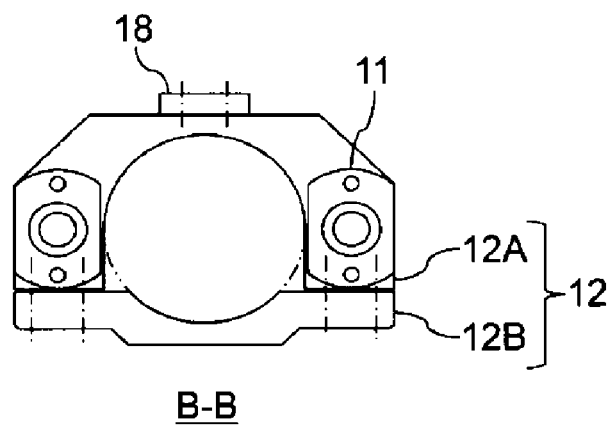
FIG. 5 is a view of a guide mechanism shown in FIG. 1, seen from arrows in positions B-B.

FIG. 1 is a front view of a tool driving device according to a first embodiment of the present invention. FIG. 2 is a top view of the tool driving device shown in FIG. 1. FIG. 3 is a right side view of a nose piece shown in FIG. 1. FIG. 4 is a view of a plate-shaped connector shown in FIG. 1, seen from arrows in positions A-A. FIG. 5 is a view of a guide mechanism shown in FIG. 1, seen from arrows in positions B-B.

A tool driving device 1 has a tool feeding mechanism 3 on a tool rotation driving device 2. The tool rotation driving device 2 is a handheld device having at least a structure for holding and rotating a tool T such as a drill or an end mill. A general purpose pneumatic drill driving device may be cited as a versatile and practical example of the tool rotation driving device 2. Depending on a working environment of a workplace, however, a device having a desired structure, such as a hydraulic drill driving device, may also be used as the tool rotation driving device 2.

In FIGS. 1 and 2, the tool rotation driving device 2 is a pneumatic tool rotation driving device that is caused to rotate the tool T by driving a pneumatic motor. For this purpose, the tool rotation driving device 2 has a tool rotation mechanism 4 for holding and rotating the tool T with an air supply port 5 and a grip 6. A switch 7 is provided on the grip 6. Air supplied through the air supply port 5 when the switch 7 is pressed is taken into the tool rotation mechanism 4, thereby driving the pneumatic motor to rotate the tool T.

Meanwhile, the tool feeding mechanism 3 is a device for positioning the tool driving device 1 itself, including the tool rotation driving device 2, and the tool T relative to the workpiece, and applying a feed operation to the tool T in a tool axis direction AX. The tool feeding mechanism 3 may be constructed as an attachment for the tool driving device 1.

The tool driving device 1 can therefore be constructed by attaching the tool feeding mechanism 3 to the desired tool rotation driving device 2. In other words, the tool rotation driving device 2 can be exchanged in accordance with the workpiece serving as the workpiece. Hence, the tool rotation driving device 2 is connected to the tool feeding mechanism 3 detachable so that a rotation operation can be applied to the tool T in a condition where the tool rotation driving device 2 is detached from the tool feeding mechanism 3.

The tool feeding mechanism 3 can be constructed by connecting a guide mechanism 8 to a cylinder mechanism 9. The guide mechanism 8 is a constituent element for positioning the tool rotation driving device 2 relative to the workplace and guiding movement of the tool rotation driving device 2 in the tool axis direction AX. The cylinder mechanism 9, meanwhile, is a constituent, element for moving the tool rotation driving device 2 in the tool axis direction AX.

Hence, the tool feeding mechanism 3 is capable of moving the tool rotation driving device 2 in the tool axis direction AX using the cylinder mechanism 9 while guiding the tool rotation driving device 2 using the guide mechanism 8.

The guide mechanism 8 may be constituted by, for example, two shafts 10 having the tool axis direction AX as a lengthwise direction, linear bushes 11 into which the respective shafts 10 can be inserted slidably, a rotation device holding member 12 fixed to the two linear bushes 11, and connectors 13 that connect respective ends of the two shafts 10.

More specifically, as shown in the drawings, respective cylinder mechanism 9 side ends of the two shafts 10 are inserted into two through holes provided in a plate-shaped connector 14. Further, recesses corresponding to set screws 15 having pointed tip ends are provided in advance in side faces of the respective shafts 10. Meanwhile, screw holes formed to be perpendicular to axes of the respective shafts 10 are provided in the plate-shaped connector 14 so as to oppose the shafts 10. The shafts 10 are fixed to the plate-shaped connector 14 by the set screws 15 screwed into the screw holes in the plate-shaped connector 14.

The set screws 15 having pointed tip ends are commercially available screws known idiomatically as cone point set screws. Further, by providing a plurality of recesses in the respective shafts 10 at a predetermined pitch for fixing the shafts 10 using the set screws 15, positions in which the respective shafts 10 are fixed to the plate-shaped connector 14 can be adjusted variably.

Other ends of the two shafts 10 on the tool T tip end side, meanwhile, are fixed to a nose piece 16 by screws or the like. As a result, the two shafts 10 are fixed parallel to the tool axis. The nose piece 16 is a component having a tip end shape to which a drill jig can be attached and provided with a central through hole into which the tool T can be inserted. In other words, the nose piece 16 is a component used to perform drilling when the tool driving device 1 is attached to the drill jig. For this purpose, in the example shown in the drawings, a bushing tip 11 is attached to the tip end of the nose piece 16. Note, however, that the bushing tip 17 has been omitted from FIG. 3.

The nose piece 16 therefore serves as the guide mechanism 8 for positioning the tool rotation driving device 2 relative to the workpiece. More specifically, the tool rotation driving device 2 can be oriented relative to the workpiece and positioned in a perpendicular direction to the tool axis direction AX using the nose piece 16. The nose piece 16 of the tool driving device 1 also serves as the connector 13 of the guide mechanism 8 that connects the ends of the two shafts 10.

When the two shafts 10 are fixed parallel to each other, the rotation device holding member 12 to which the two linear hushes 11 are attached can be slid along the shafts 10. The rotation device holding member 12 is a component for holding the tool rotation driving device 2. Therefore, when the tool rotation driving device 2 is held by the rotation device holding member 12, the tool rotation driving device 2 can be slid in the tool axis direction AX, i.e. the lengthwise direction of the shafts 10.

As shown in the drawings, for example, the rotation device holding member 12 can be constructed by connecting two members 12A and 12B to each other using a connector such as a screw in a condition where the tool rotation mechanism 4 of the tool rotation driving device 2, which has a circular outer periphery, is sandwiched between the two members 12A and 12B. Further, by providing two through holes in the rotation device holding member 12 and fitting or inserting the linear bushes 11 into the respective through holes fixedly, the two linear bushes 11 can be attached to the rotation device holding member 12.

The guide mechanism 8 thus configured is fixed to the cylinder mechanism 9. In the example shown in the drawings, the plate-shaped connector 14 for connecting the two shafts 10 to each other is fixed to the cylinder mechanism 9 by a screw.

Hence, by adjusting the fixing positions of the shafts 10 using the set screws 15, a relative position of the guide mechanism 8 relative to the cylinder mechanism. 9 in the tool axis direction AX can be adjusted. As a result, a length of the guide mechanism 8 in the tool axis direction AX can be adjusted in accordance with respective lengths of the tool T and the tool rotation driving device 2. In other words, a movable range of the tool rotation driving device 2 can be determined in alignment with the lengths of both the tool T and the tool rotation driving device 2.

Note that the shafts 10 are not limited to being fixed by the set screws 15, and instead, an adjustment mechanism for adjusting the length of the guide mechanism 8 in the tool axis direction AX may be formed with a desired structure and provided on the tool feeding mechanism 3.

Further, it is practical to use a pneumatic cylinder mechanism as the cylinder mechanism 9, similarly to the tool rotation driving device 2, and therefore FIG. 1 shows an example of the pneumatic cylinder mechanism 9 that is driven by air. Depending on the work environment of the workpiece, however, a cylinder mechanism that is driven using another fluid such as a gas or a liquid as a medium, for example a hydraulic cylinder mechanism, may also be used as the cylinder mechanism 9. This applies likewise to the tool rotation driving device 2.

Figure 6:
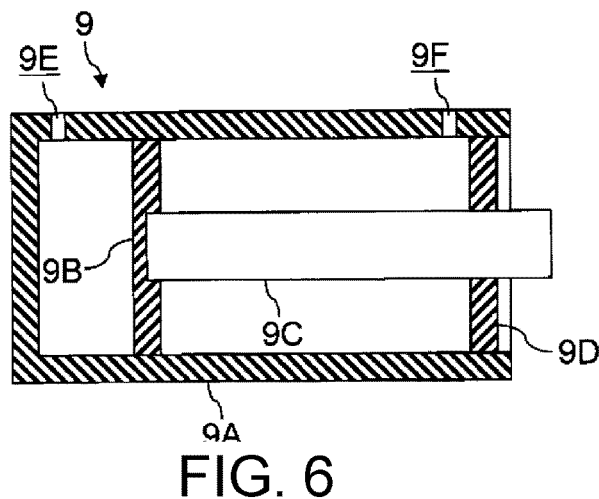
FIG. 6 is a longitudinal sectional pattern diagram showing a structure of a cylinder mechanism shown in FIG. 1.

FIG. 6 is a longitudinal sectional pattern diagram showing a structure of the cylinder mechanism 9 shown in FIG. 1.

The cylinder mechanism 9 can be constructed by inserting a disc-shaped piston 9B into a cylindrical cylinder tube 9A having one closed end. One end of a rod 9C is fixed to a central part of the piston 9B. An open side end of the cylinder tube 9A is closed by a disc-shaped plate 90 provided with a through hole into which the rod 9C is inserted.

As a result, a length by which the rod 9C projects from the cylinder tube 9A varies as the piston 9B slides through the cylinder tube 9A in an axial direction.

Two through holes 9E and 9F through which air is supplied or discharged are provided in the cylinder tube 9A on either side of the piston 9B. More precisely, the two through holes 9E, 9F are provided on either side of a movement range of the piston 9B. Hence, when air is supplied through the through hole 9E provided further toward the closed end side of the cylinder tube 9A than the piston 9B, a pressure of the air on the closed end side of the cylinder tube 9A increases, causing the piston 9B to move in a direction for pushing the rod 9C out to the exterior of the cylinder tube 9A. At this time, the air in the cylinder tube 9A is discharged through the through hole 9F on the rod 9C side of the piston 9B.

Conversely, when air is supplied through the through hole 9F on the rod 9C side of the piston 9B, the pressure of the air on the rod 9C side of the cylinder tube 9A increases, causing the piston 9B to move in a direction for pulling the rod 9C back into the interior of the cylinder tube 9A. At this time, the air in the cylinder tube 9A is discharged through the through hole 9E on the opposite side of the piston 9B to the rod 9C.

Hence, by selecting one of the two through holes 9E, 9F as a supply destination of the air supplied to the cylinder mechanism 9, the piston 9E of the cylinder mechanism 9 can be moved, in a desired direction. The cylinder mechanism 9 having this structure is commercially available and distributed under the product name "low friction cylinder".

Further, the rod 9C side of the cylinder mechanism. 9 can be connected to the tool rotation driving device 2 either directly or indirectly. The cylinder mechanism 3 and the tool rotation driving device 2 can be connected by any structure as long as the tool rotation driving device 2 moves in the tool axis direction AX in conjunction with the movement of the piston 9B and the rod 9C of the cylinder mechanism 9. In the example shown in the drawings, a tip end of the rod 90 of the cylinder mechanism 9 is fixed to the rotation device holding member 12 of the guide mechanism 8 via an L shaped connector 18. As a result, the tool rotation driving device 2 is fixed to the piston 9B and the rod 9C of the cylinder mechanism 9 via the rotation device holding member 12 and the L shaped connector 18.

In another example, the cylinder mechanism 9 and the tool rotation driving device 2 can be connected such that an axis of the rod 90 of the cylinder mechanism 9 is parallel with the tool axis. In this case, a plurality of cylinder mechanisms 9 can be fixed to the guide mechanism 8. In other words, as long as the tool rotation driving device 2 can be moved in the tool axis direction AX by power of the piston 9B on the exterior of the cylinder tube 9A, the cylinder mechanism 9 may be disposed as desired. In this case, a holding mechanism for holding the tool rotation driving device 2 such that the power of the piston 9B in the cylinder mechanism 9 is transmitted to the tool rotation driving device 2 is provided on the tool feeding mechanism 3 in accordance with the disposal position of the cylinder mechanism 9.

Note, however, that by disposing the cylinder mechanism 9 so that the axis of the rod 9C of the cylinder mechanism 9 is aligned with the tool axis, as in the drawings, it is possible to prevent force from being generated in an unnecessary direction. In the example shown in the drawings, therefore, the guide mechanism 8 serves as the holding mechanism for holding the tool rotation driving device 2.

Hence, by driving the piston 9B of the cylinder mechanism 9, the tool rotation driving device 2 itself can be moved in the tool axis direction AX together with the tool T. In this case, the two through holes 9E and 9F provided on either side of the piston 9B are used as a supply port and a discharge port for the air that causes the piston 9B to advance in order to move the tool rotation driving device 2 in the tool axis direction AX.

The cylinder tube 9A side of the cylinder mechanism 9, meanwhile, is connected to the nose piece 16 either directly or indirectly. In the example shown in the drawings, the cylinder tube 9A side, or in other words a non-driven portion, of the cylinder mechanism 9 is connected to the nose piece 16 indirectly via the shafts 10 of the guide mechanism 8. As a result, the non-driven portion side of the cylinder mechanism 9 can be positioned relative to the workpiece. Hence, the nose piece 16 also functions as a positioning mechanism for positioning the cylinder mechanism 9 relative to the workplace.

When both the cylinder mechanism 9 and the tool rotation driving device 2 are pneumatic, measures are preferably taken to ensure that the air supplied to drive the tool rotation driving device 2 to rotate can also be used to drive the cylinder mechanism 9. Further, in a case where the tool rotation driving device 2 is caused to advance at a predetermined feed speed by driving the cylinder mechanism 9, it is important to stop the tool rotation driving device 2 in a predetermined position and at an appropriate timing and to cause the tool rotation driving device 2 to retreat quickly.

For this purpose, the tool driving device 1 is provided with a switching mechanism 19 that switches the piston 9B of the cylinder mechanism 9 between advancement and retreat using the air for driving the tool rotation driving device 2. More specifically, the switching mechanism 19 for switching the air supply destination so that an air discharge port for causing the piston 9B to advance is used, as an air supply port for causing the piston 9B to retreat can be provided in the cylinder mechanism 9.

An operating valve 20 can be used as the switching mechanism 19. The operating valve 20 switches an air flow passage in response to an air pressure input signal. In the example shown in the drawings, the operating valve 20 is attached to the cylinder mechanism 9 via an L shaped bracket 21.

Figure 7:
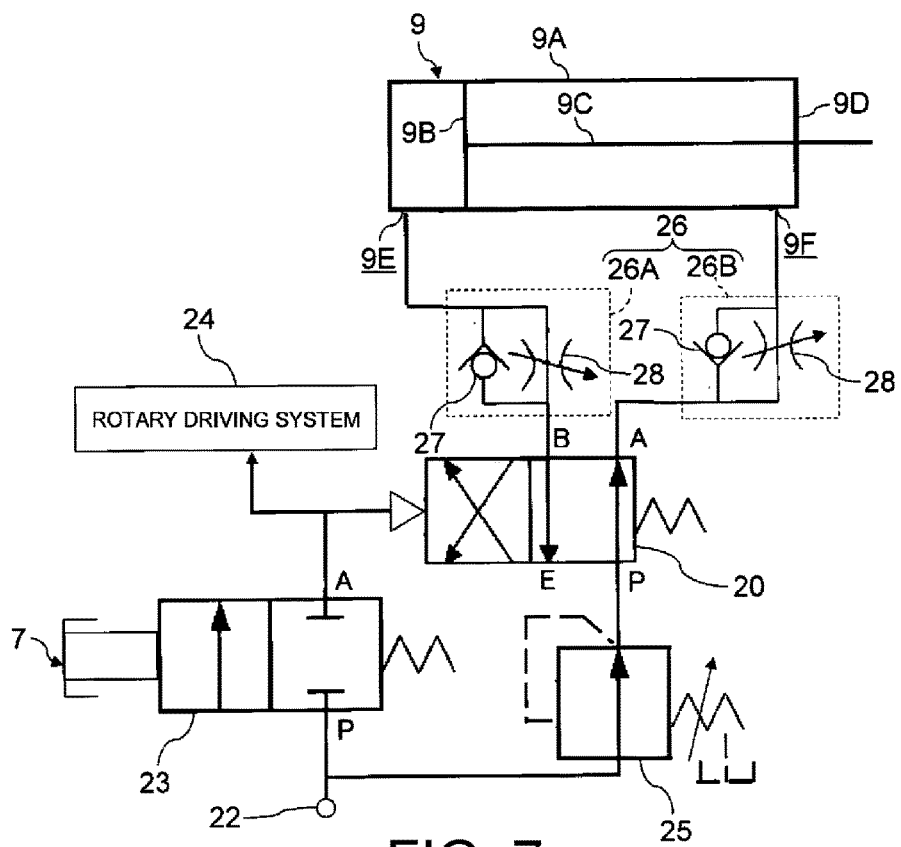
FIG. 7 is a pipe circuit diagram illustrating a system for supplying air to the cylinder mechanism shown in FIG. 1, including an operating valve, using Japanese Industrial Standards (JIS) symbols.

FIG. 7 is a pipe circuit diagram illustrating a system for supplying air to the cylinder mechanism 9 shown in FIG. 1, including the operating valve 20, using JIS symbols.

As shown in FIG. 7, a pipe through which air is supplied to the tool rotation driving device 2 from an air supply source 22 as main air is connected to a Press (P) port of a control valve 23 that is provided on the tool rotation driving device 2 as the switch 7 and opened/closed by a pressing operation. When the switch 7 constituted by the control valve 23 is pressed, the P port, which serves as an input port of the control valve 23, is connected to an A port such that air is supplied to a rotary driving system 24 that is provided in the tool rotation driving device 2 and includes a pneumatic motor. As a result, the tool rotation driving device 2 can be driven to rotate.

Further, the pipe carrying the air supplied from the air-supply source 22 bifurcates so as to be connected to a P port of the operating valve 20. Note that a pressure reducing valve 25 may be provided between the air supply source 22 and the operating valve 20. In so doing, a pressure of the air input into the P port of the operating valve 20 can be adjusted.

In a pre-switch condition, the P port of the operating valve 20 is connected at all times to an A port, while an Exhaust (E) port serving as a discharge side of the operating valve 20 is connected to a B port in the pre-switch condition. The A port of the operating valve 20 is connected to the through hole 9F on the side for pushing the piston 9B back into the cylinder mechanism 9. The B port of the operating valve 20, on the other hand, is connected to the through hole 9E on the side for pushing the piston 9B out of the cylinder mechanism 9.

Accordingly, a part of the air supplied from the air supply source 22 when the operating valve 20 is in the pre-switch condition passes through the operating valve 20 so as to be supplied to the side for pushing the piston 9B back into the cylinder mechanism 9. Meanwhile, the air discharged when the piston 9B is pushed back into the cylinder mechanism 9 passes through, the operating valve 20 so as to be discharged from the E port. Hence, when the operating valve 20 is in the pre-switch condition, the piston 9B is pushed back such that the tool rotation driving device 2 connected, to the rod 9C is set in a retreat position.

Note that a speed controller 26 is preferably provided between the operating valve 20 and the cylinder mechanism 9. The speed controller 26 is a relay device constructed by connecting a check valve 27 and a variable throttle 28 in parallel and used to perform air speed control.

The speed controller 26 may be provided in at least one of the two air flow passages connecting the operating valve 20 to the cylinder mechanism 9. In the example shown in the drawing, first and second speed controllers 26A, 26B are provided respectively in the two air flow passages connecting the operating valve 20 to the cylinder mechanism 9.

Air can also be used as power for switching the operating-valve 20. For this purpose, in the example shown in FIG. 7, the pipe between the A port of the control valve 23 provided on the tool rotation driving device 2 as the switch 7 and the rotary driving system 24 bifurcates so as to be connected to a switch control input port of the operating valve 20. In other words, the operating valve 20 is switched by the air that passes through the control valve 23 provided as the switch 7.

More specifically, when the switch 7 is pressed, the P port and the A port of the control valve 23 are connected such that a part of the air for driving the rotary driving system 24 is input into the switch control input port of the operating valve 20. As a result, the operating valve 20 is switched such that the P port is connected to the B port and the A port is connected to the E port.

Accordingly, the air input into the P port of the operating valve 20 flows from the B port into the through hole 9E on the side for pushing the piston 9B out of the cylinder mechanism 9 via the first speed controller 26A. As a result, the rod 9C is pushed out of the cylinder tube 9A together with the piston 9B, whereby the tool rotation driving device 2 formed integrally with the rod 9C advances. Further, air is discharged through the other through hole 9F in the cylinder mechanism 9. The discharged air is input into the A port, of the operating valve 20 via the second speed controller 26B. The air input into the A port is then discharged into the atmosphere through the E port.

Furthermore, when the depressed switch 7 is released, the air supplied to the rotary driving system 24 including the pneumatic motor is interrupted, whereby rotary driving of the tool rotation driving device 2 is stopped. Simultaneously, the air input into the switch control input port of the operating valve 20 is also interrupted. As a result, the operating valve 20 returns to the pre-switch condition. The air supplied from the supply source 22 is then supplied to the side for pushing the piston 9B back into the cylinder mechanism 9 again via the operating valve 20 and the second speed controller 26B.

As a result, the piston 9B is pushed back such that the tool rotation driving device 2 connected to the rod 9C retreats. Meanwhile, the air that is discharged when the piston 9B is pushed back into the cylinder mechanism 9 is led from the B port to the E port of the operating valve 20 via the first speed controller 26A and then discharged into the atmosphere. When the piston 9B reaches the end of the cylinder tube 9A, the tool rotation driving device 2 stops in the retreat position, whereby an initial condition is re-established.

Hence, a path along which the air is supplied to the cylinder mechanism 9 can be switched using the operating valve 20. In other words, the air supply destination can be switched so that the air discharge port for causing the piston 9B to advance is used as the air supply port for causing the piston 9B to retreat.

Further, by employing a pneumatic valve as the operating valve 20, the air for driving the tool rotation driving device 2 to rotate can also be used to open and close the operating valve 20. In other words, by employing an air-operated valve, the air supply destination can be switched using air. As a result, the tool T can be both rotated and moved in a feed direction simply by supplying air.

Note, however, that the switching mechanism 19 for switching the path of the air supplied to the cylinder mechanism 9 and the path of the air discharged from the cylinder mechanism 9 may be constituted by a valve that switches the air paths using power other than compressed air, such as a hydraulic operating valve or a solenoid valve, instead of an air-operated valve. In this case, a path for supplying a fluid such as oil or electricity used to switch the valve is provided in the tool driving device 1 separately from the air supply path.

Furthermore, when a mechanism driven by a fluid other than air or a fluid such as a special gas, for example a hydraulic cylinder, is used as the cylinder mechanism 9, the switching mechanism 19 may be constructed using a valve for switching a path of the corresponding fluid. Likewise in this case, the structure of the tool feeding mechanism 3 can be simplified by ensuring that the power for driving the tool rotation driving device 2 to rotate is identical to the power for driving the switching mechanism 19.

Moreover, by designing the pipe circuit of the air pressure signal and so on such that the operating valve 20 is switched when the switch 7 for driving the tool rotation driving device 2 is pressed, rotation and advancement of the tool T can be performed in conjunction. In other words, the tool T can be caused to advance only while the tool T rotates following depression of the switch 7.

Furthermore, by providing the speed controller 26, as shown in the drawings, the speed of the air or other fluid supplied to the cylinder mechanism 9 and the speed of the air or other fluid discharged from the cylinder mechanism 9 can be adjusted. As a result, an advancement speed of the tool rotation driving device 2, or in other words the feed speed of the tool T, can be controlled variably.

More specifically, by providing the first speed controller 26A, a flow rate of the fluid that is supplied to the supply port of the cylinder mechanism 9 to cause the piston 9B to advance can be adjusted. In other words, by operating the variable throttle 28 of the first speed controller 26A, the flow rate of the fluid supplied to the supply port to cause the piston 9B to advance can be adjusted, and as a result, the advancement speed of the tool rotation driving device 2 can be controlled.

By providing the second speed controller 26B, meanwhile, a flow rate of the fluid that is discharged from the discharge port of the cylinder mechanism 9 to cause the piston 9B to advance can be adjusted. In other words, by operating the variable throttle 28 of the second speed controller 26B, the flow rate of the fluid discharged from the discharge port to cause the piston 9B to advance can be adjusted, and as a result, the advancement speed of the tool rotation driving device 2 can be controlled.

Note that a system for controlling the speed of the air or other fluid flowing into the cylinder mechanism 9 is known as a meter-in system. Conversely, a system for controlling the speed of the air or other fluid discharged from the cylinder mechanism 9 is known as a meter-out system. Hence, by employing one or both of a meter-in system and a meter-out system, the advancement speed of the piston 9B, the rod 9C, the tool rotation driving device 2, and the tool T can be controlled.

On the other hand, since it is necessary to ensure that advancement of the piston 9B, the rod 9C, the tool rotation driving device 2, and the tool T can be stopped instantaneously and switched to retreat quickly by operating the switch 7, there is no need to restrict the speed of the air that flows into and out of the cylinder mechanism 9 in order to push back the piston 9B.

For the reasons described above, as shown in FIG. 7, the first speed controller 26A is oriented to be capable of controlling the speed of the air supplied to the cylinder mechanism 9, or in other words in alignment with the meter-in system. Conversely, the second speed controller 26B is oriented, to be capable of controlling the speed of the air discharged, from the cylinder mechanism 9, or in other words in alignment with the meter-out system.

The speed of the air supplied to the cylinder mechanism 9 and a thrust of the piston 9B can also be adjusted by providing the pressure reducing valve 25 on the path of the air or other fluid flowing into the cylinder mechanism 9, as shown in the drawings, in addition to the first speed controller 26A and the second speed controller 26B. In other words, by operating the pressure reducing valve 25, the flow rate of the fluid supplied into the cylinder tube 9A to cause the piston 9B to advance in the tool axis direction AX can be adjusted. In the example shown in the drawings, the pressure reducing valve 25 is connected to an inlet side of the operating valve 20, but the pressure reducing valve 25 may also be provided to the front or the rear of the first speed controller 26A or in place of the first speed controller 26A.

In addition to the constituent elements described above, the tool driving device 1 is preferably provided with a trapping prevention mechanism for preventing a hand of a user from becoming trapped when the tool rotation driving device 2 advances or retreats.

In the example shown in the drawings, two rod-shaped trapping prevention bars 29 are provided on the plate-shaped connector 14 forming the guide mechanism 8 of the tool feeding mechanism 3. The trapping prevention bars 29 are members for preventing a hand from becoming trapped between the tool rotation driving device 2 and the cylinder mechanism 9 when the tool rotation driving device 2 retreats. For this purpose, the two trapping prevention bars 29 are provided to intersect a void that is formed between the cylinder mechanism 9 and the rotation device holding member 12 when the tool rotation driving device 2 is in the retreat position.

The trapping prevention bars 29 double as fixtures for fixing the plate-shaped connector 14 to the cylinder mechanism 9, and can therefore be used to fix the plate-shaped connector 14 to the cylinder mechanism 9 more securely as well as preventing hands from becoming trapped when the tool rotation driving device 2 returns to the retreat position.

(Operations and Actions)

When a workpiece is to be drilled using the tool driving device 1 having the configuration described above, first, the tool rotation driving device 2 holding the tool T is connected to the tool feeding mechanism 3. More specifically, the tool rotation driving device 2 holding the tool T is held by the tool feeding mechanism 3 so that the power of the piston 9B in the cylinder mechanism 9 provided in the tool feeding mechanism 3 is transmitted thereto. The tool rotation driving device 2 is also connected to the air supply source 22. Meanwhile, a drill jig is attached to the workpiece.

Next, the tool driving device 1, which includes the cylinder mechanism 9 provided in the tool feeding mechanism 3, is positioned relative to the workpiece by the nose piece 16 that serves as the positioning mechanism connected directly or indirectly to the cylinder tube 9A side of the cylinder mechanism 9. More specifically, the bushing tip 17 is attached to the tip end of the nose piece 16, and the tip end of the nose piece 16 is connected to the drill jig.

Next, air is supplied to the tool rotation driving device 2 from the air supply source 22. The air is then supplied to the cylinder mechanism 9 via the operating valve 20 and the second speed controller 263. As a result, the piston 9B and the tool rotation driving device 2 are set in the retreat position.

When the switch 7 of the tool rotation driving device 2 is switched ON, air is supplied to the rotary driving system 24 including the pneumatic motor. As a result, the tool rotation mechanism 4 of the tool rotation driving device 2 is driven such that the tool T rotates. When the operating valve 20 is switched, meanwhile, air is supplied to the cylinder mechanism 9 via the first speed controller 26A, and as a result, the piston 9B advances. Accordingly, the tool rotation driving device 2 is moved in the tool axis direction AX by the power of the piston 9B on the exterior of the cylinder tube 9A. The movement speed of the tool rotation driving device 2 and the tool T can be adjusted at this time by operating the variable throttle 28 of one or both of the first speed controller 26A and the second speed controller 26B.

Thus, the workpiece can be drilled at a desired feed speed. Further, when the switch 7 of the tool rotation driving device 2 is switched OFF once drilling of the workpiece is complete, the air supply to the rotary driving system 24 including the pneumatic motor is interrupted. Accordingly, the tool T stops rotating. The air input signal input into the operating valve 20 is also interrupted, whereby the operating valve 20 is switched. As a result, air is supplied to the cylinder mechanism 9 via the second speed controller 26B. Accordingly, the piston 9B retreats until the piston 9B and the tool rotation driving device 2 return to their respective home positions.

In other words, the tool feeding mechanism 3 and the tool driving device 1 described above are used to position the tool T relative to the workpiece via the guide mechanism 8, hold the tool rotation driving device 2, guide the movement of the tool rotation driving device 2 in the tool axis direction AX, and cause the tool rotation driving device 2 to advance in the tool axis direction AX via the cylinder mechanism 9 connected to the guide mechanism 8.

(Effects)

Hence, with the tool feeding mechanism 3 and the tool driving device 1, a feed operation and a return operation can be applied to the tool T, such as a drill, in the tool axis direction AX automatically using an extremely simple structure. For example, even a general purpose drill rotation driving device not having a function for feeding the tool T can easily be provided with an automatic tool feeding function simply by attaching the tool feeding mechanism 3 thereto.

A drill driving device that is made capable of controlling the feed speed of a tool by attaching a hydraulic damper thereto so as to be parallel to the tool is available in the related art. When a hydraulic damper is used, however, a hydraulic system must be provided in the drill driving device. Further, a structure for causing the hydraulic damper to contact a contact, plate is required for ON/OFF control of the hydraulic damper. Moreover, a complicated air pipe path is required to align the hydraulic damper with the rotation and feed operations of the drill driving device.

The tool feeding mechanism 3 and the tool driving device 1, on the other hand, are provided with the switching mechanism 19 for switching the supply destination of the fluid supplied to the cylinder mechanism 9 between a first supply port to which the fluid is supplied to cause the piston 9B to advance in the tool axis direction AX and a second supply port to which the fluid is supplied to cause the piston 9B to retreat. Hence, by switching the fluid supply destination from the first supply port for causing the piston 9B to advance in the tool axis direction AX to the second supply port for causing the piston 9B to retreat, the advancing tool rotation driving device 2 and tool T can be stopped instantaneously without the need to provide a conventional hydraulic damper. In other words, a situation in which the advancing tool rotation driving device 2 and tool T advance excessively toward the workpiece due to inertia can be avoided.

Furthermore, with the tool feeding mechanism 3 and the tool driving device 1, the feed speed of the tool T can be controlled by operating the speed controller 26. More specifically, the tool feeding mechanism 3 and the tool driving device 1 are provided with the variable throttle 28 that controls the advancement speed of the tool rotation driving device 2 by adjusting at least one of the flow rate of the fluid that is supplied into the cylinder tube 9A to cause the piston 9B to advance in the tool axis direction AX and the flow rate of the fluid that is discharged from the cylinder tube 9A to cause the piston 9B to advance in the tool axis direction AX.

Hence, with the tool feeding mechanism 3 and the tool driving device 1, the need for the hydraulic damper that is conventionally believed to be necessary to stop the tool T and control the feed speed of the tool T can be eliminated. As a result, the structure of the tool feeding mechanism 3 and the tool driving device 1, including the air pipe paths, can be greatly simplified.

In addition, when the speed of the tool is controlled using a hydraulic damper, an axis of the hydraulic damper and the tool axis are not collinear. Therefore, in a conventional structure employing a hydraulic damper, unnecessary force including a component in a radial direction of the tool is invariably generated during feed speed control.

With the tool feeding mechanism 3 and the tool driving device 1, on the other hand, the cylinder mechanism 9 can be disposed such that the axis of the cylinder mechanism 9 and the tool axis are collinear, and therefore the generation of unnecessary force in a direction other than the tool axis direction AX during control of the feed speed of the tool T can be prevented.

Further, the switching mechanism 19 for switching the supply destination of the fluid supplied to the cylinder mechanism 9 is constituted by the operating valve 20, formed from an air-operated valve or the like, that switches the supply destination using a similar fluid to the fluid supplied to the cylinder mechanism 9. As a result, an increase in the number of power sources can be suppressed.

Moreover, in the tool feeding mechanism 3 and the tool driving device 1, components are connected using detachable connectors such as screws, and therefore the tool T, the tool rotation driving device 2, and the cylinder mechanism 9 can be replaced in accordance with the workpiece.

Second Embodiment

Figure 8:
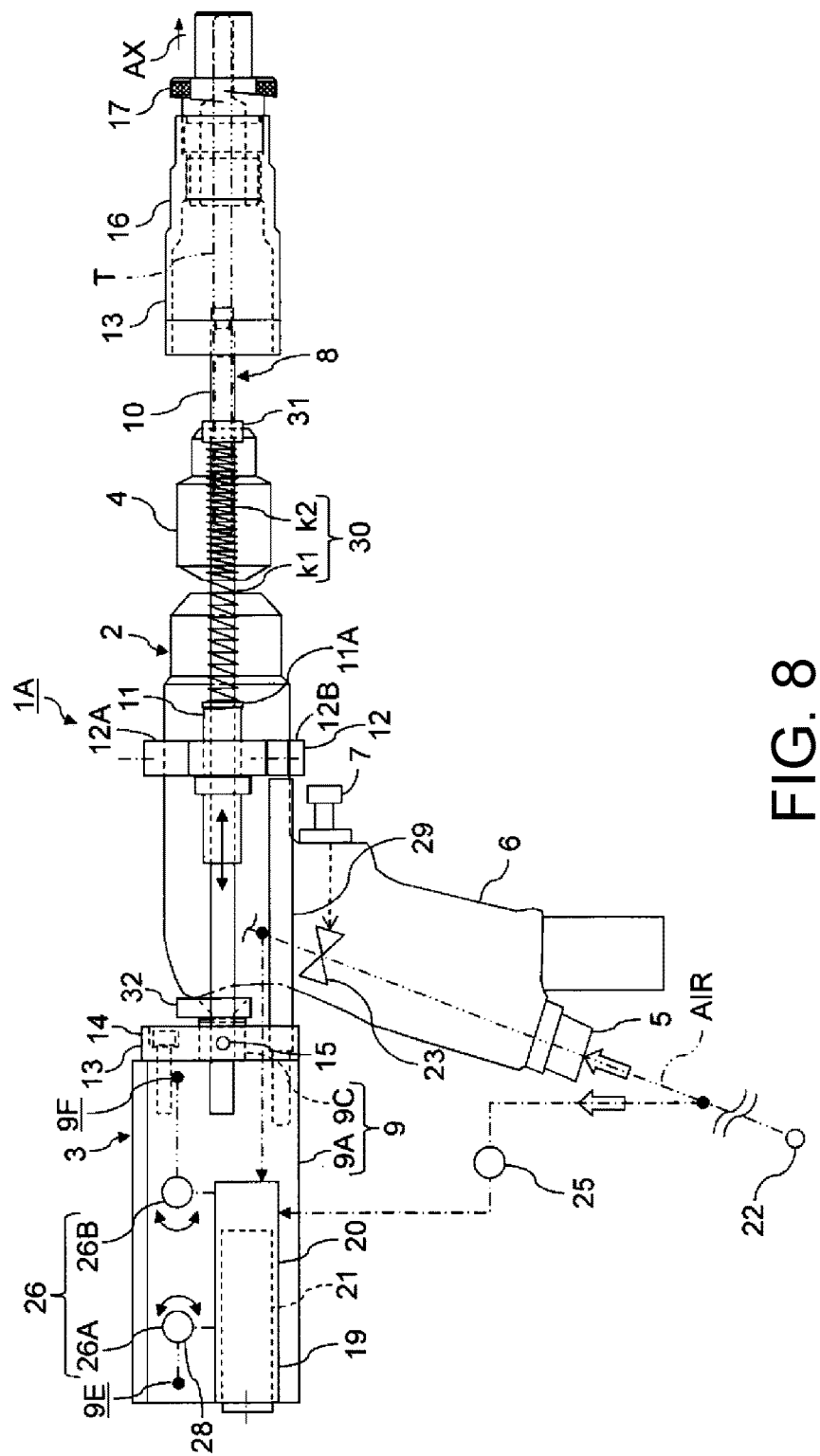
FIG. 8 is a front view of a tool driving device according to a second embodiment of the present invention.
Figure 9:
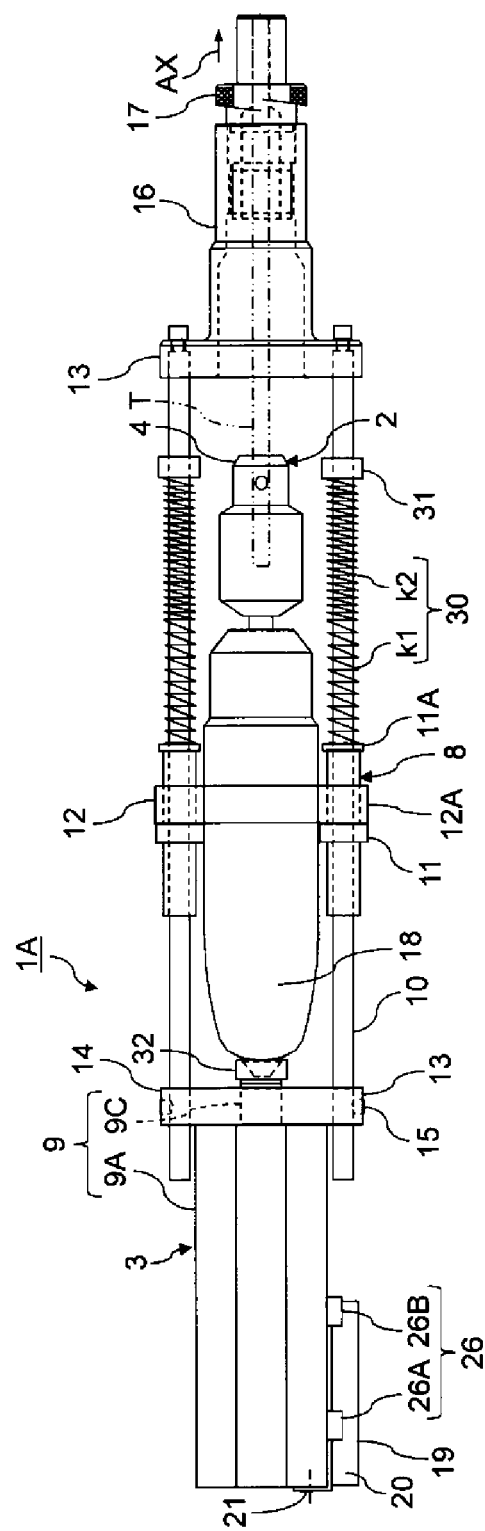
FIG. 9 is a top view of the tool driving device shown in FIG. 8.

FIG. 8 is a front view of a tool driving device according to a second embodiment of the present invention, and FIG. 9 is a top view of the tool driving device shown in FIG. 8.

A tool driving device 1A according to the second embodiment, shown in FIG. 8, differs from the tool driving device 1 according to the first embodiment, shown in FIG. 1, in that springs 30 are provided on the tool feeding mechanism 3 as elastic bodies for assisting feed control of the tool rotation driving device 2, and the L shaped connector 18 is not provided. All other configurations and actions are substantially identical to those of the tool driving device 1 shown in FIG. 1. Accordingly, identical configurations have been allocated identical reference symbols, and description thereof has been omitted.

In the tool driving device 1A, the springs 30 are provided using the two shafts 10 constituting the guide mechanism 8 as shafts. In the example shown in FIG. 8, the springs 30 are provided on the respective shafts 10 on the tool T tip end side of the linear bushes 11. Further, to prevent the springs 30 from reaching their natural length, ring-shaped stoppers 31 are fixed to the respective shafts 10 on the tool T tip end sides of the springs 30. Stopper portions 11A are also provided on the spring 30 sides of the linear bushes 11. In other words, the springs 30 are provided respectively between the linear bushes 11, which are capable of sliding using the shafts 10 as guides, and the stoppers 31 fixed to the shafts 10.

Furthermore, in the tool driving device 1A, instead of connecting the rod 9C of the cylinder mechanism 9 to the rotation device holding member 12 via the L shaped connector 18, a contact plate 32 is attached to the tip end of the rod 9C of the cylinder mechanism 9, and the contact plate 32 is caused to contact a rear end portion of the tool rotation driving device 2. Hence, when the cylinder mechanism 9 is driven such that the rod 9C advances in the tool axis direction AX together with the piston 9B, the tool rotation driving device 2 pressed against the rod 9C is pushed out in the tool axis direction AX. As a result, the tool rotation driving device 2 also advances.

When the linear bushes 11 advance along the shafts 10 together with the tool rotation driving device 2, the springs 30 are pressed so as to generate a reaction force. The reaction force from the springs 30 increases as an advancement distance of the tool rotation driving device 2 increases. As a result, the advancement speed of the tool rotation driving device 2 and the tool T can be gradually reduced.

In other words, according to the tool driving device 1A, the advancement speed of the tool rotation driving device 2 can be adjusted by the reaction force of the springs 30 in addition to the thrust of the cylinder mechanism 9, which is subjected to advancement speed control by the speed controller 26. When the tool rotation driving device 2 is caused to retreat, on the other hand, the tool rotation driving device 2 is moved by an elastic force of the springs 30 instead of the thrust of the cylinder mechanism 9.

Hence, according to the tool driving device 1A, during advancement in a case where drilling needs to be performed at a considerably reduced feed speed, the feed speed can be reduced automatically as the advancement distance of the tool T increases without operating the speed controller 26. Moreover, a deceleration rate of the feed speed can be adjusted variably by adjusting fixing positions of the stoppers 31 in advance. Conversely, when the tool rotation driving device 2 and the tool T are caused to retreat, the tool rotation driving device 2 and the tool T can be returned to their initial positions quickly by the reaction force from the springs 30.

The springs 30 can therefore be used to cause the tool rotation driving device 2 to retreat and to adjust the advancement speed of the tool rotation driving device 2. Hence, the springs 30 can be attached in any position as long as the springs 30 are capable of assisting the retreat of the tool rotation driving device 2 and adjustment of the advancement speed of the tool rotation driving device 2. For example, the springs 30 may be provided on the respective shafts 10 on the cylinder mechanism 9 side of the linear bushes 11. In this case, a reaction force is generated by the springs 30 when the springs 30 are pulled.

Furthermore, an elastic body such as the spring 30 may be attached to another part of the guide mechanism 8, and an elastic body may also be attached to the cylinder mechanism 9. In other words, an elastic body may be attached in any position of the tool feeding mechanism 3. However, providing the springs 30 on the shafts 10 of the guide mechanism 8, as shown in the drawings, leads to a reduction in the number of components.

Note that singular or plural springs 30 having a plurality of different spring constants may be attached to the tool feeding-mechanism 3. In this case, the advancement speed of the tool rotation driving device 2 can be adjusted nonlinearly. In the example shown in the drawings, two springs 30 having different spring constants k1, k2 are provided in series on a common shaft 10. In so doing, the tool rotation driving device 2 and the tool T can be decelerated in two steps.

In particular, when forming a through hole in a composite material such as Carbon Fiber Reinforced Plastics (CFRP), the feed speed can be reduced immediately before penetration, and as a result, inter-layer peeling (delamination) can be prevented. When forming a through hole in a metal, on the other hand, burrs can be prevented from forming.

Further, by operating the variable throttle 28 of the speed controller 26 in conjunction to adjust the speed of the tool rotation driving device 2, a feed operation can be applied to the tool rotation driving device 2 at an appropriate feed speed for through-hole drilling conditions. More specifically, the feed speed of the tool T can be controlled such that the feed speed of the tool T is set to be relatively low as the tool T enters the workpiece, the feed speed of the tool T is set to be relatively-high during processing in a condition where the tool T has entered but not yet penetrated the workpiece, and the feed speed of the tool T is set to be relatively low as the tool T penetrates the workpiece.

Note that the elastic body is not limited to a spring having a fixed spring constant, and a spring having an unfixed, irregular spring constant may also be used. In this case, the speed of the tool T can be controlled nonlinearly using a single spring.

Even when a spring having a fixed spring constant is used, however, the speed of the tool T can be controlled nonlinearly by making an axial length of the shaft 10 or the like that is passed through the spring longer than the natural length of the spring. In other words, the advancement speed of the tool T can be reduced only when the advancement distance of the tool T reaches a fixed distance. Note that in this case, the rod 9C of the cylinder mechanism 9 and the rotation device holding member 12 are preferably connected via the L shaped connector 18 to ensure that the tool rotation driving device 2 reliably retreats to its initial position.

On the other hand, as shown in the drawings, the rod 9C of the cylinder mechanism 9 and the rotation device holding member 12 may be connected via the L shaped connector 18 in a case where the elastic force of the springs 30 acts constantly on the tool rotation driving device 2. In this case, the thrust of the cylinder mechanism 9 and the elastic force of the springs 30 can be used in conjunction to cause the tool rotation driving device 2 to retreat.

Further, the springs 30 are not limited to spiral springs, and springs having other structures, such as gas springs, may be used instead. Alternatively, a damper having a spring may be used as long as the damper functions as an elastic body.

Furthermore, when the tool rotation driving device 2 is caused to retreat using the elastic force of the springs 30, the air pipe path can be simplified. More specifically, the pipe path may be configured so that when the switch 7 for driving the tool rotation driving device 2 is pressed, air is supplied to at least the supply port of the cylinder mechanism 9 for causing the piston 9B to advance. As a result, the switching mechanism 19, such as the operating valve 20, may be omitted.

With the tool driving device 1A according to the second embodiment, as described above, similar effects to the effects of the tool driving device 1 according to the first embodiment can be obtained. In addition, simply by providing an elastic body such as the springs 30, the feed speed of the tool T can be controlled. Moreover, the air pipe path can be simplified, and the L shaped connector 18 for connecting the cylinder mechanism 9 to the rotation device holding member 12 can be omitted.

Third Embodiment

Figure 10:
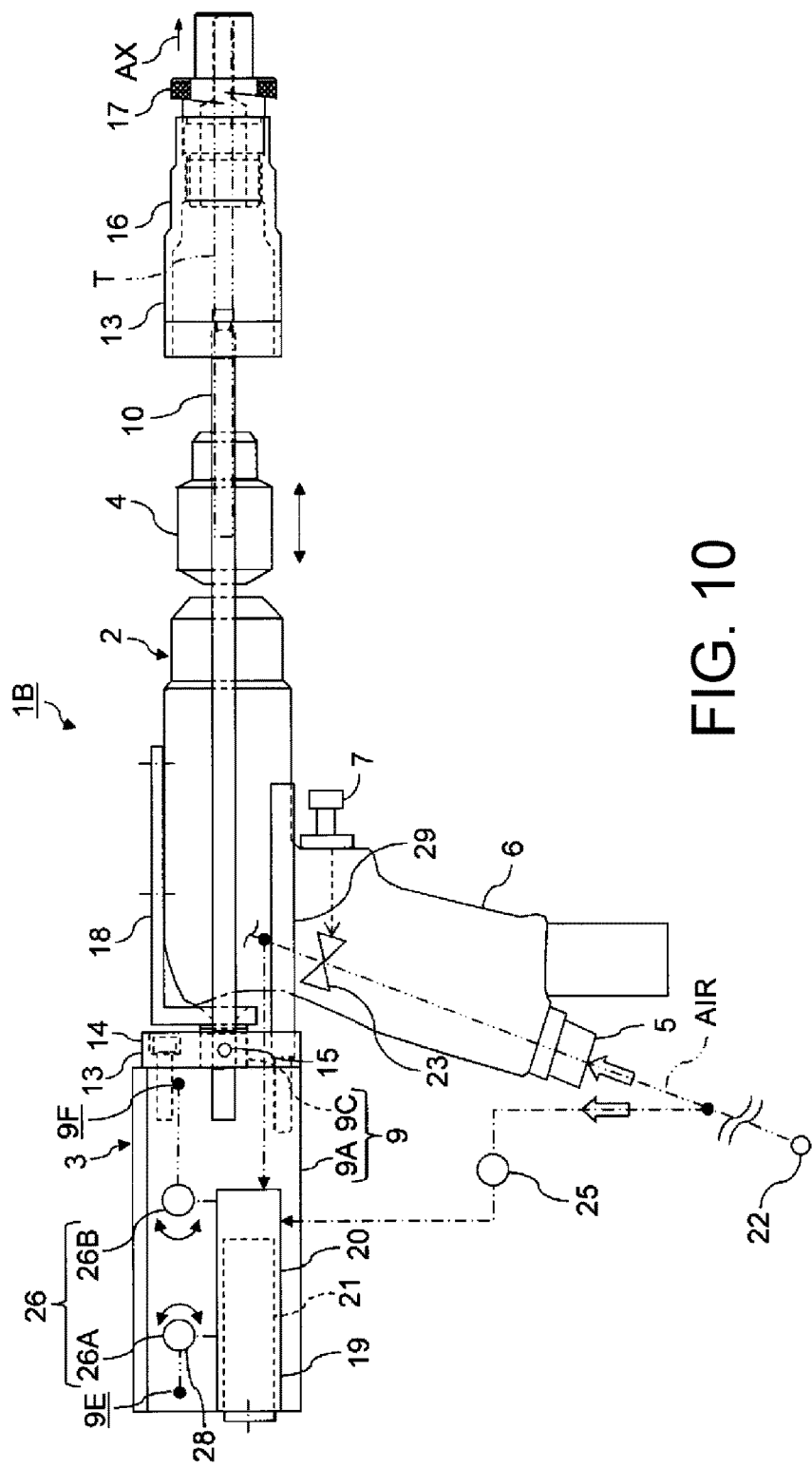
FIG. 10 is a front view of a tool driving device according to a third embodiment of the present invention.

FIG. 10 is a front view showing a tool driving device according to a third embodiment of the present invention.

A tool driving device 1B according to the third embodiment, shown in FIG. 10, differs from the tool driving device 1 according to the first embodiment, shown in FIG. 1, in that the guide mechanism 8 of the tool rotation driving device 2 is not provided, and the tool rotation driving device 2 is connected to the cylinder mechanism 9 by the L shaped connector 18 alone. All other configurations and actions are substantially identical to those of the tool driving device 1 shown in FIG. 1. Accordingly, identical configurations have been allocated identical reference symbols, and description thereof has been omitted.

As shown in FIG. 10, the tool rotation driving device 2 can be integrated with the rod 9C of the cylinder mechanism 9 while oriented fixedly in the tool axis direction AX by a desired fixing member such as the L shaped connector 18. As shown in the drawing, for example, the tool rotation, driving device 2 can be oriented fixedly in the tool axis direction AX by fixing the tool rotation driving device 2 in at least two locations using fixing members such as screws. Alternatively, the orientation of the tool rotation, driving device 2 may be fixed by fixing the tool rotation, driving device 2 planarly or linearly in a single location.

In other words, the L shaped, connector 18 and a simple fixing member such as a screw may be used as the holding mechanism for holding the tool rotation driving device 2 such that the power of the piston 9B in the cylinder mechanism 9 is transmitted to the tool rotation driving device 2.

In this case, the guide mechanism 8 of the tool rotation driving device 2 may be omitted, and therefore the configuration of the tool feeding mechanism 3 of the tool driving device 13 can be simplified. In the example shown in FIG. 10, the two shafts 10 are used as fixing members for fixing the nose piece 16 to the cylinder tube 9A side of the cylinder mechanism 9. Note that the cylinder tube 9A side of the cylinder mechanism 9 and the nose piece 16 may be connected by a tubular casing instead of the shafts 10.

Further, similarly to the first, and second embodiments, the tool rotation driving device 2 is connected to the tool feeding mechanism 3 detachably so that a rotation operation can be applied to the tool T in a condition where the tool rotation driving device 2 is detached from the tool feeding mechanism 3. In other words, the tool driving device 1B may be constructed by adding a structure for attaching and detaching the tool rotation driving device 2 to and from the tool feeding mechanism 3 to a general purpose pneumatic drill device serving as the tool rotation driving device 2. Alternatively, the tool driving device 1B may be constructed using a specialized tool rotation driving device 2 provided with, a structure for attaching and detaching the tool rotation driving device 2 to and from the tool feeding mechanism 3 as a constituent element. Further, the tool driving device 1B according to the third embodiment may be provided with the springs 30 illustrated in the second embodiment.

Fourth Embodiment

Figure 11:
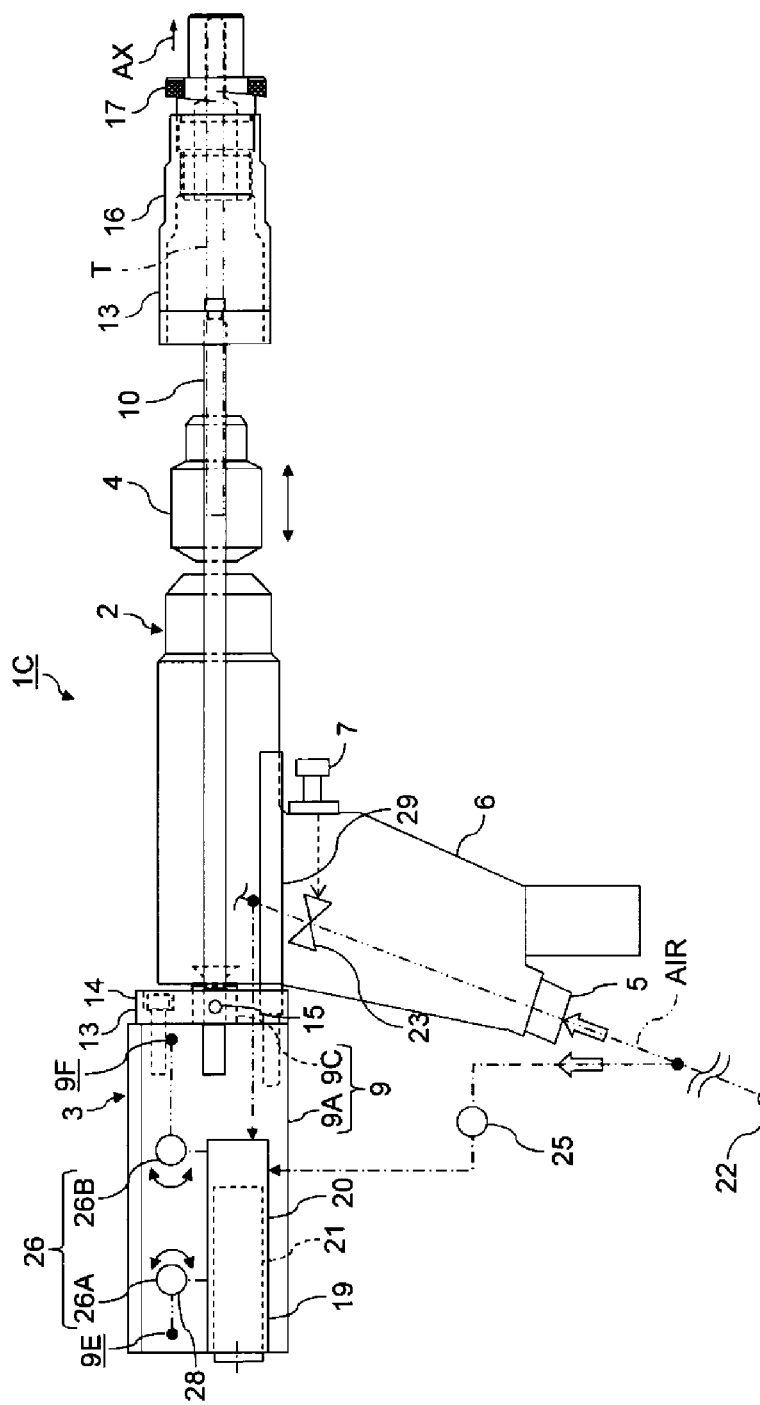
FIG. 11 is a front view of a tool driving device according to a fourth embodiment of the present invention.

FIG. 11 is a front view showing a tool driving device according to a fourth embodiment of the present invention.

A tool driving device 1C according to the fourth embodiment, shown in FIG. 11, differs from the tool driving device 1 according to the first embodiment, shown in FIG. 1, in that the tool rotation driving device 2 is integrated with the cylinder mechanism 9. All other configurations and actions are substantially identical to those of the tool driving device 1 shown in FIG. 1. Accordingly, identical configurations have been allocated identical reference symbols, and description thereof has been omitted.

As shown in FIG. 11, the tool rotation driving device 2 can be fixed permanently to the rod 9C of the cylinder mechanism 9. In other words, detachment of the tool rotation driving device 2 from the cylinder mechanism 9 may be prohibited except in special cases such as for repair. In this case, the tool driving device 1C can be constructed using a specialized tool rotation driving device 2, rather than a general purpose pneumatic drill device or the like, as a constituent element.

More specifically, a desired fixing member for integrating the rod 9C and the tool rotation driving device 2 may be used as the holding mechanism for holding the tool rotation driving device 2 so that the power of the piston 9B in the cylinder mechanism 9 is transmitted to the tool rotation driving device 2. Accordingly, the fixing member is not limited to a fixing member that is fastened or a fixing member such as a connector, and instead, a fixing method that does not allow detachment, such as welding or soldering, may also be used. Alternatively, the holding mechanism for holding the tool rotation driving device 2 may be formed by integrating the tool rotation driving device 2 and the rod 9C of the cylinder mechanism 9 by casting or molding.

Note that a part of the constituent elements, such as the grip 6, the switch 7, and the air supply port 5, may be provided on the cylinder mechanism 9 side rather than the tool rotation driving device 2 side. Further, the cylinder tube 9A side of the cylinder mechanism 9 may foe connected to the nose piece 16 by a tubular casing instead of the shafts 10.

With the tool driving device 10 according to the fourth embodiment, structured as described above, a structure for attaching and detaching the tool rotation driving device 2 to and from the tool feeding mechanism 3 easily is not required. Therefore, the number of components can be reduced, with the result that the tool driving device 1C is more suitable for mass production.

Note that the tool driving device 1C according to the fourth embodiment may also be provided, with the guide mechanism 8 for guiding the movement of the tool rotation driving device 2 in the tool axis direction AX, similarly to the first and second embodiments. Further, the tool driving device 1C according to the fourth embodiment may be provided, with the springs 30 illustrated in the second embodiment.

Other Embodiments

Specific embodiments were described above, but the described embodiments are merely examples, and are not intended to limit the scope of the invention. The novel method and device described herein may be realized in various other embodiments. Further, various omissions, replacements, and modifications may be applied to the embodiments of the method and device described herein within a scope that does not depart from the spirit of the invention. The attached claims and their equivalents are encompassed by the scope and spirit of the invention, and therefore include these various embodiments and modifications applied thereto.

For example, the respective drawings depict an example in which the cylinder mechanism 9 and the tool rotation driving device 2 are driven using compressed air as power. As described above, however, the tool driving device 1, 1A, 1B, 1C may be constructed using a cylinder mechanism or a tool rotation driving device that uses another fluid, or a gas as power, such as a hydraulic cylinder mechanism or a tool rotation driving device. Further, a cylinder mechanism having a different structure, such as a load-bearing type cylinder mechanism having an inbuilt ball bush, may be used as the cylinder mechanism 9.

Furthermore, a controller for automatically generating an air pressure signal that is input into the cylinder mechanism 9 and the operating valve 20 may be connected to the tool driving device 1, 1A, 1B, 1C. For example, a feed operation for step drilling may be applied to the tool T automatically by having a control device generate an air pressure signal for switching the operating valve 20 at fixed time intervals.

Needless to mention, the tool feeding mechanism and the tool driving device may be constructed by combining technical elements of the respective embodiments.

What is claimed is:

1. A tool driving device for movement of a handheld tool rotation driving device, comprising:
   a cylinder mechanism comprising a cylinder tube that houses a piston, the cylinder mechanism adapted to move a handheld tool rotation driving device that holds and rotates a tool, an axis of a rod of the cylinder mechanism being aligned with a tool axis, the cylinder mechanism having a first supply port to which fluid is supplied for causing the piston to advance in a tool axis direction and a second supply port to which fluid is supplied for causing the piston to retreat;

a positioning mechanism connected to the cylinder tube of the cylinder mechanism either directly or indirectly by two parallel shafts for positioning the cylinder mechanism relative to a workpiece, the two parallel shafts being disposed to be symmetric about the tool axis such that a plane in which the tool axis extends intersects both parallel shafts, the positioning mechanism being adapted for fixation to a drill jig attached to the workpiece during drilling, the positioning mechanism having a bushing tip adapted to be inserted into a guide hole of the drill jig;

a holding mechanism adapted to hold the handheld tool rotation driving device at a position externally of the cylinder tube such that movement of the piston is transmitted to the handheld tool rotation driving device to move the handheld tool rotation driving device in the tool axis direction, the holding mechanism being adapted to hold the handheld tool rotation driving device at a rod side of the cylinder mechanism; and a switching mechanism adapted to switch a supply destination of the fluid supplied to the cylinder mechanism between the first supply port and the second supply port based on an input received at an operating valve of the switching mechanism, the input being an input fluid that also drives rotation of a tool held by the handheld tool rotation driving device and which is supplied from a common supply source as the fluid that is being switched between the first supply port and the second supply port.

2. The tool driving device according to claim 1, further comprising a variable throttle adapted to control an advancement speed of the handheld tool rotation driving device by adjusting at least one of a flow rate of fluid supplied into the cylinder tube to cause the piston to advance in the tool axis direction and a flow rate of fluid discharged from the cylinder tube to cause the piston to advance in the tool axis direction.

3. The tool driving device according to claim 1, further comprising an elastic body adapted to adjust an advancement speed of the handheld tool rotation driving device.

4. The tool driving device according to claim 1, further comprising a singular elastic body or plural elastic bodies adapted to adjust an advancement speed of the handheld tool rotation driving device nonlinearly.

5. The tool driving device according to claim 1, further comprising an elastic body adapted to cause the handheld tool rotation driving device to retreat.

6. The tool driving device according to claim 1, further comprising a guide mechanism adapted to guide movement of the handheld tool rotation driving device in the tool axis direction.

7. The tool driving device according to claim 6, further comprising an adjustment mechanism to adjust a length of the guide mechanism in the tool axis direction.

8. The tool driving device according to claim 1, further comprising a pressure reducing valve to adjust a flow rate of fluid supplied into the cylinder tube to cause the piston to advance in the tool axis direction.

9. The tool rotation driving device according to claim 1, further comprising a supply line for receiving the input fluid from the supply source, the supply line being configured to feed input fluid to the operating valve concurrently with a feeding of input fluid to a rotary driving system for rotating the tool.

10. The tool driving device according to claim 9, further comprising a variable throttle adapted to control an advancement speed of the handheld tool rotation driving device by adjusting at least one of a flow rate of fluid supplied into the cylinder tube to cause the piston to advance in the tool axis direction and a flow rate of fluid discharged from the cylinder tube to cause the piston to advance in the tool axis direction.

11. The tool driving device according to claim 9, further comprising an elastic body adapted to adjust an advancement speed of the handheld tool rotation driving device.

12. The tool driving device according to claim 9, further comprising a singular elastic body or plural elastic bodies adapted to adjust an advancement speed of the handheld tool rotation driving device nonlinearly.

13. The tool driving device according to claim 9, further comprising an elastic body adapted to cause the handheld tool rotation driving device to retreat.

14. The tool driving device according to claim 9, further comprising a guide mechanism adapted to guide movement of the handheld tool rotation driving device in the tool axis direction.

15. The tool driving device according to claim 14, further comprising an adjustment mechanism to adjust a length of the guide mechanism in the tool axis direction.

16. The tool driving device according to claim 9, further comprising a pressure reducing valve to adjust a flow rate of the fluid supplied into the cylinder tube to cause the piston to advance in the tool axis direction.

17. A tool assembly comprising:
the tool driving device according to claim 9, and
a handheld tool rotation driving device connected to the tool driving device.

18. A tool assembly comprising:
the tool driving device according to claim 1; and
a handheld tool rotation driving device connected to the tool driving device.

19. A tool driving method comprising:
positioning a cylinder mechanism relative to a workpiece using a positioning mechanism that is coupled either directly or indirectly to a cylinder tube of the cylinder mechanism by two parallel shafts disposed to be symmetric about a tool axis such that a plane in which the tool axis extends intersects both parallel shafts, an axis of a rod of the cylinder mechanism being aligned with the tool axis, the positioning mechanism being adapted for fixation to a drill jig attached to the workpiece during drilling, the positioning mechanism having a bushing tip adapted to be inserted into a guide hole of the drill jig;
holding a tool by a handheld tool rotation driving device, and holding the handheld tool rotation driving device externally of the cylinder tube by fixing the handheld tool rotation driving device to a rod side of the cylinder mechanism, such that movement of a piston provided in the cylinder tube of the cylinder mechanism moves the handheld tool rotation driving device;
supplying a fluid to a first supply port of the cylinder mechanism to cause the piston to advance along a tool axis direction, thereby moving the handheld tool rotation driving device to advance along the tool axis direction;
switching, via a switching mechanism attached to the cylinder mechanism, a supply destination of the fluid supplied to the cylinder mechanism from the first supply port of the cylinder mechanism to a second supply port of the cylinder mechanism; and supplying fluid to the second supply port of the cylinder mechanism to cause the piston to retreat along the tool axis direction, thereby moving the handheld tool rotation driving device to retreat along the tool axis direction, wherein switching the supply destination of the fluid between the first supply port and the second supply port is effected based on reception of an input at an operating valve of the switching mechanism, the input being an input fluid that also drives rotation of a tool held by the handheld tool rotation driving device and which is supplied from a common supply source as the fluid that is being switched between the first supply port and the second supply port.

* * * * *